United States Patent
Violette et al.

(10) Patent No.: US 8,075,270 B2
(45) Date of Patent: Dec. 13, 2011

(54) FAN BLADE RETENTION AND VARIABLE PITCH SYSTEM

(75) Inventors: John A. Violette, Granby, CT (US); Eric Stephen Loos, Middletown, CT (US)

(73) Assignee: Rotating Composite Technologies LLC, Kensington, CT (US)

( * ) Notice: Subject to any disclaimer, the term of this patent is extended or adjusted under 35 U.S.C. 154(b) by 395 days.

(21) Appl. No.: 12/465,163

(22) Filed: May 13, 2009

(65) Prior Publication Data

US 2009/0285686 A1    Nov. 19, 2009

Related U.S. Application Data

(60) Provisional application No. 61/052,717, filed on May 13, 2008.

(51) Int. Cl.
*B63H 1/06* (2006.01)
*F01D 7/00* (2006.01)
*F03B 3/14* (2006.01)
*F04D 29/36* (2006.01)
*B63H 3/00* (2006.01)
*B64C 11/00* (2006.01)
*B64C 27/00* (2006.01)

(52) U.S. Cl. .......................... 416/155; 416/148; 416/154

(58) Field of Classification Search .................. 416/155, 416/154, 148, 102, 134 A, 48, 46, 127, 129, 416/136, 140
See application file for complete search history.

(56) References Cited

U.S. PATENT DOCUMENTS

| | | | | | |
|---|---|---|---|---|---|
| 2,986,222 | A | * | 5/1961 | Biermann | 416/46 |
| 3,380,535 | A | * | 4/1968 | Biermann | 416/46 |
| 3,690,788 | A | * | 9/1972 | Pedersen et al. | 416/157 R |
| 3,757,647 | A | * | 9/1973 | Abramopaulos | 91/482 |
| 3,893,789 | A |   | 7/1975 | Andrews | |
| 4,021,142 | A |   | 5/1977 | Violette | |
| 4,097,189 | A | * | 6/1978 | Harlamert | 416/46 |
| 4,124,330 | A |   | 11/1978 | Barnes | |
| 4,591,313 | A | * | 5/1986 | Miyatake et al. | 416/155 |
| 4,648,798 | A | * | 3/1987 | Voisard | 416/48 |
| 4,759,689 | A | * | 7/1988 | Roman | 416/148 |
| 4,842,484 | A | * | 6/1989 | Johnson | 416/127 |
| 5,022,825 | A |   | 6/1991 | Violette et al. | |

FOREIGN PATENT DOCUMENTS

| | | |
|---|---|---|
| EP | 1961919 A2 | 8/2008 |
| GB | 2194990 A | 3/1988 |
| GB | 2197912 A | 6/1988 |
| WO | 2006086342 | 8/2006 |

* cited by examiner

*Primary Examiner* — Chris Chu
(74) *Attorney, Agent, or Firm* — Michaud-Kinney Group LLP (57) ABSTRACT

A system for providing variable pitch to a rotor blade of an aircraft engine includes a rotatable hub; at least one blade mounted on the rotatable hub; a gear mechanism operably connected to the rotatable hub; a timing ring rotatably and operably connected to the gear mechanism; and a pitch arm operably connecting the timing ring and the at least one blade mounted on the rotatable hub. In the operation of the system, the gear mechanism facilitates the rotation of the timing ring to vary the pitch of the at least one blade mounted on the rotatable hub.

20 Claims, 10 Drawing Sheets

FAN BLADE RETENTION AND VARIABLE PITCH SYSTEM

CROSS REFERENCE TO RELATED APPLICATION

This application claims the benefits of U.S. Provisional Patent Application Ser. No. 61/052,717, filed May 13, 2008, the content of which is incorporated herein by reference in its entirety.

TECHNICAL FIELD

The present invention relates in general to systems for mounting fan blades in aircraft engines and, more particular, to a system in which the fan blades of aircraft engines are retained and in which the pitch of the blades of such systems are varied during use. Changing the incidence angle of fan blades allows expansion of design configurations in turbofan engines into more efficient operating regimes (higher fan bypass ratios and lower fan pressure ratios), restricted to date by potential stability (fan blade flutter) issues. This invention offers a superior alternative to the current approach of avoiding incidence angle instabilities in new engines by changing the area of the duct behind the fan.

BACKGROUND

Standard methods of accomplishing pitch change in propellers, helicopter rotors, or some fans with limited number of blades, usually include a root attachment mechanism such as a ball/roller bearing and/or flex member, which allows rotation of the blade with relatively low friction. Such devices can be heavy due to the high blade centrifugal forces they must support. A further complication is that centrifugal loads on blade plate-like structures also produce significant twisting forces that pitch control systems must overcome. These forces tend to rotate the blade towards a dangerous flat pitch position, such that a malfunction in pitch control could result in rotor overspeed(s) and potential blade loss.

The force required to change the pitch angle of a rotating blade can be appreciable. In propeller technology, where variable-pitch was incorporated many years ago, this force is usually referred to as the Total Twisting Moment (TTM), which is the net sum of three basic forces. The first is Centrifugal Twisting Moment (CTM) that originates from the non-symmetrical mass distribution (i.e. oblong airfoil, non-circular) of a blade's airfoil about its pitch change axis. Second is Aerodynamic Twisting Moment (ATM) caused when the effective center of pressure on each airfoil section is aligned forward or aft of the pitch change axis and that airload causes a twisting load about the blade pitch axis. Last is Frictional Twisting Moment (FTM) which resists motion and develops in the retention bearings that support the blade, due to high centrifugal loads acting on them. Among these, CTM is by far the greatest, with ATM and FTM distant seconds. CTM acts to rotate a blade toward low pitch. Because the aerodynamic center of pressure of a blade's airfoil is usually forward of its pitch change axis, ATM normally acts to increase blade pitch, opposing CTM. FTM caused by friction, acts to oppose blade pitch change in either direction.

With TTM being dominated by CTM, the pitch control system exerts a twisting load in the direction of increased pitch to hold blade pitch constant, and a higher force yet to overcome FTM in order to increase blade pitch. If there is a malfunction and/or loss of control of the pitch system, a blade will naturally turn toward low pitch. Because low blade pitch results in less rotational resistance for the engine, the situation can result in a dangerous overspeed of the rotor and engine with a powered engine. Loss of engine power is usually accompanied by loss of pitch control. Again TTM can turn the blades to low pitch, but rotor thrust suddenly switches to a high drag force that can cause possible loss of aircraft control and/or result in rotor overspeed. Rotor overspeed is more likely if the rotor is driven by a turbine engine rather than a piston engine, especially if the former has a "free" turbine that powers the rotor. In a turbofan engine, with the great number of blades in the fan, loss of pitch control and the turning of blades to low pitch could cause significant drag and overspeed conditions. Therefore, backup pitch-change systems, pitch safety latches, or other complicated, expensive and/or heavy solutions have not been attractive to date.

To prevent undesirable change in pitch tendencies, the conventional solution is to add a counter-weight to the side of a blade at/near its root end. This weight must be of sufficient mass and position to create a net TTM that will always be able to overcome all inherent blade twist loads and drive the blade towards high pitch, or at least hold pitch setting to prevent movement toward low pitch. The counter-weight mass on each blade is normally quite substantial and adds undesirable weight to the rotor, as well as additional load to the rotor hub and blade retention bearings. Also, there is the added risk of failure of a counter-weight support arm, possible impact damage if the weight strikes the aircraft fuselage, combined with dangerous unbalance of the rotor.

Another means of addressing undesirable change in pitch tendencies involves use of a back-up pitch change system such as an auxiliary electric pump to backup a hydraulic system, which could drive pitch angle high to a "Feather" position, etc. Also, a high friction device(s), such as a linear ACME thread in the pitch actuation system, or a harmonic drive device, or latching device could be utilized, any of which can be designed to hold the current pitch position if pitch control is lost. The latter have the beneficial effect of allowing continued operation if the malfunction occurs in a fortuitous operating condition and/or there is continuous power from the engine. However, if pitch is held in a less-than-optimal position for gliding, or twin engine operation, there could still be a compromised flight control situation(s) that develops from the increased drag forces generated.

Turbofan engines, which derive 90 percent of their thrust from the large fan up front (essentially a ducted propeller), still do not make use of variable pitch today. Because engine speed generally remains nearly constant with jet engines, power is adjusted with fuel flow. However, all of today's jet engines have fixed pitch blades, which utilize larger, compromised airfoils to provide sufficient thrust that enables takeoff capability at full load on a hot day. Consequently, these engines suffer an efficiency penalty in cruise, when there is more blade airfoil than required, as it is at less than optimum blade angle. If aircraft travel is to survive for future generations, efficiency and fuel savings will need to be significantly increased.

SUMMARY

Changing the pitch of a fan blade provides a convenient means of controlling the thrust-producing and/or power-absorbing capacity of a propulsive device. This can make a fan propulsor significantly more efficient and responsive to changes in rotor operating conditions, such as variations in air velocity entering the fan, or the level of power applied to it. For example, a turbo-fan engine used to propel aircraft of various designs can experience/require significant changes in velocity and operating power between static thrust operation, take-off, climb, cruise and/or descent, and landing conditions.

A new system of rotor blade attachment, retention and pitch control is disclosed which simplifies most aspects of a variable pitch propulsor system, while significantly reducing system cost and weight, maintaining rotor operational safety and greatly increasing rotor efficiency. This design has the potential to convert fixed pitch fans to safe, light, highly efficient, variable pitch systems, while maintaining serviceability. Also, this design is well suited for large, ducted, high bypass fans in turbofan jet engines, where fuel savings of 15 to 20 percent over current designs could be possible. To date, there has not yet been a successful design that achieves a safe, practical, lightweight, cost effective means of incorporating a variable-pitch feature in turbofan engines to take advantage of this increased efficiency. High fuel prices are driving the market and will make this feature, offered by this invention, ever more desirable.

In one aspect, the present invention is directed to a system for providing variable pitch to a rotor blade of an aircraft engine. The system comprises a rotatable hub; at least one blade mounted on the rotatable hub; a gear mechanism operably connected to the rotatable hub; a timing ring rotatably and operably connected to the gear mechanism; and a pitch arm operably connecting the timing ring and the at least one blade mounted on the rotatable hub. In the operation of the system, the gear mechanism facilitates the rotation of the timing ring to vary the pitch of the at least one blade mounted on the rotatable hub.

In another aspect, the present invention resides in a system for retaining a fan blade of an aircraft and providing variable pitch to the fan blade. Such a system comprises a rotatable hub; at least one fan blade mounted on the rotatable hub; a gear mechanism operably connected to the rotatable hub; a drive motor connected to and in operable communication with the gear mechanism; a timing ring rotatably and operably connected to the gear mechanism; and a pitch arm operably connecting the timing ring and the at least one fan blade mounted on the rotatable hub. In operating the system, the drive motor rotates the timing ring via the gear mechanism to vary the pitch of the at least one fan blade mounted on the rotatable hub.

DESCRIPTION OF INVENTION

Figure 1:
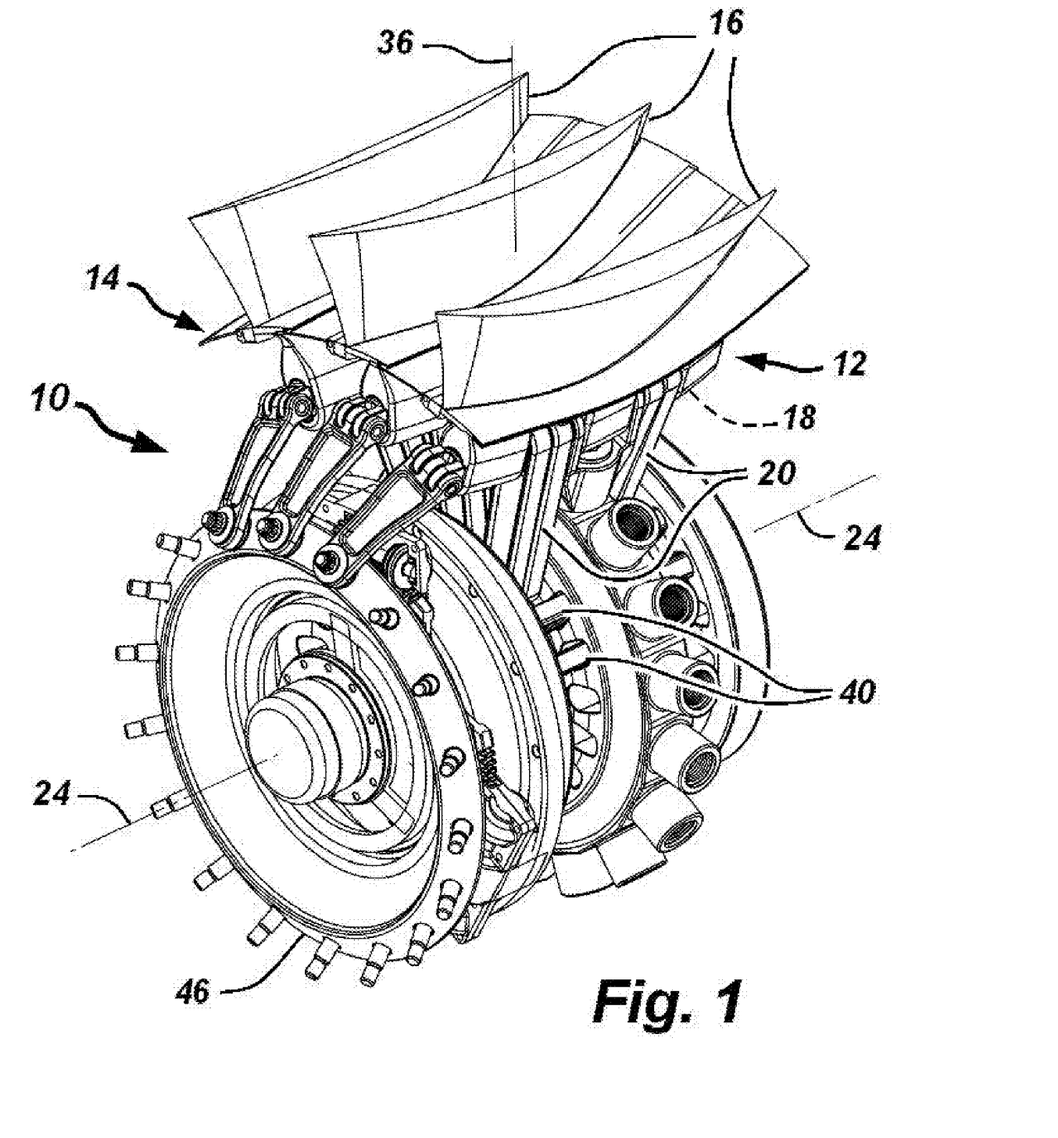
FIG. 1 is a perspective view of a system for retaining a rotor blade of an aircraft and effecting variable pitch of said blade.
Figure 2:
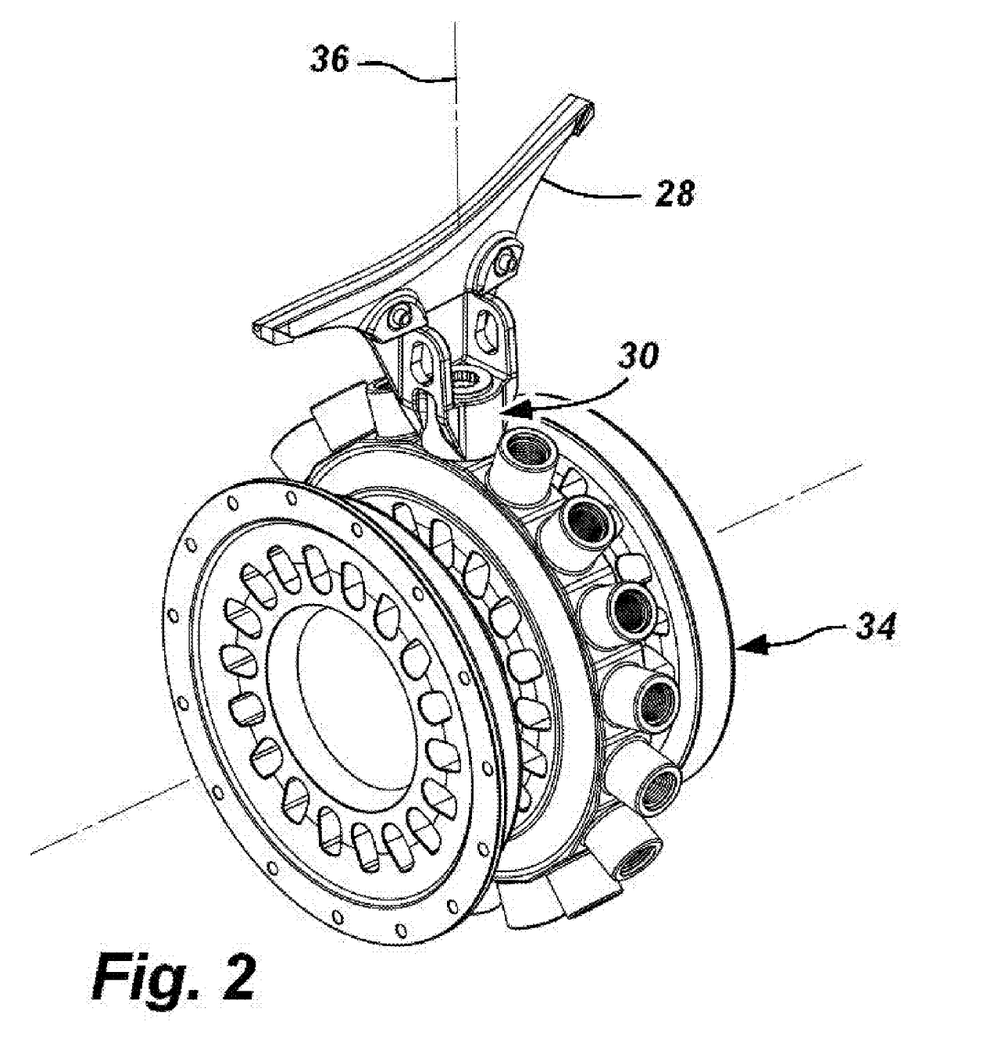
FIG. 2 is a perspective view of a central hub of the system of FIG. 1.
Figure 9:
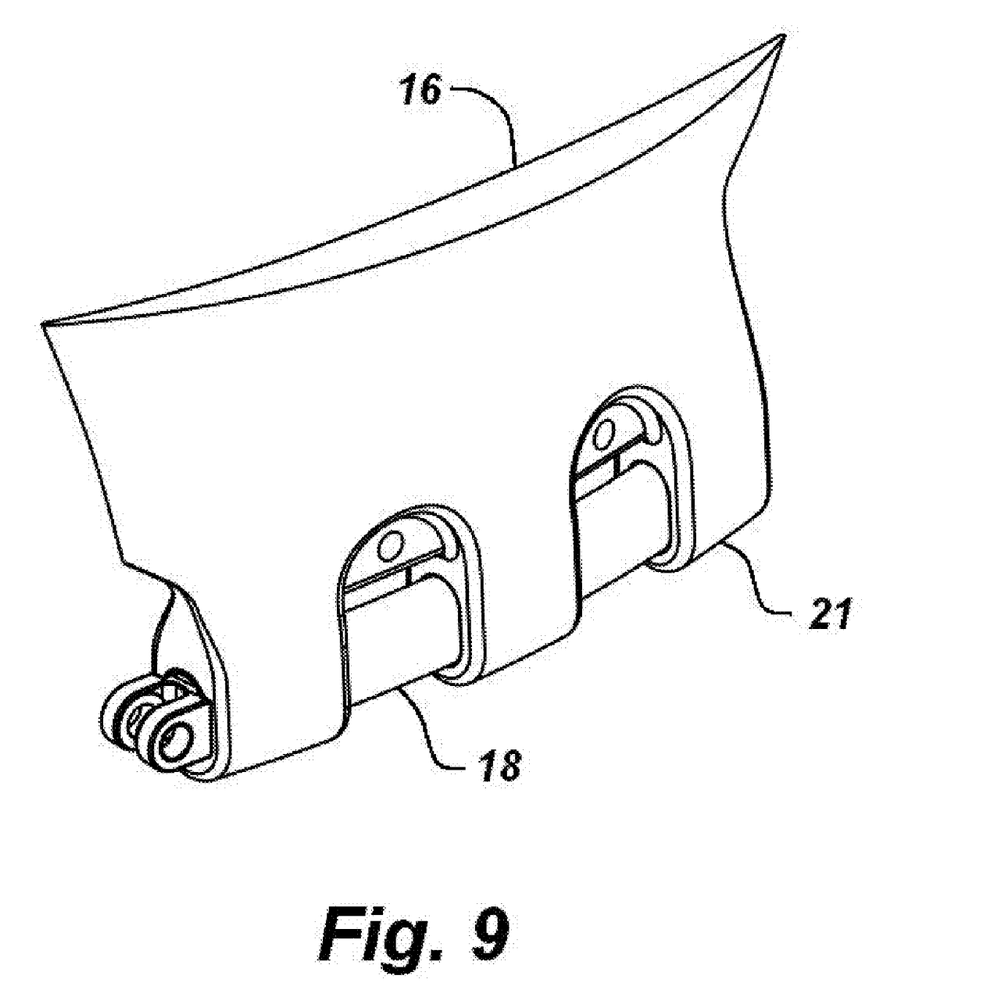
FIG. 9 is a perspective view of the blade pin inserted into the tennons at the pin root portion of a blade.

Referring to FIGS. 1 and 2, a system for fan rotor blade retention and effecting variable pitch of the rotor blade is shown generally at 10 and is hereinafter referred to as "system 10." System 10 retains a rotor blade having a pin root (the pin design can be of circular or non-circular cross-section) means of attachment. The pin root portion 12 is inboard of a centerbody airflow path 14. The pin root portion 12 includes a blade 16 having three blade tennons (shown at 21 in FIGS. 3 and 6) extending therefrom wrapping around a pin 18. The pin 18 is shown inserted through the blade in FIG. 9. The three blade tennons 21 define spaces therebetween for accommodating at least two flexible support tennons 20 arising from a central hub 34. In this invention, the hub is on the rotor centerline 24, with at least two flexible support tennons 20 attached to the pin 18 in the spaces between the three blade tennons 21. These support tennons 20 extend further inward and attach to the central hub 34, each support tennon 20 able to pivot or flex in such a way as to help balance the blades CTM and ATM forces.

The flexiblesupport tennons 20 are of sufficient length and inherent flexibility to permit an acceptable amount of angular rotation of the common pin 18 supporting the blade 16. The root of the blade 16 is nestled in a cradle-shaped component (cradle 28) that incorporates a clevis 30 mounted over a central post or other similar feature of the central hub 34, establishing an axis 36 about which blade pitch rotation occurs. This system 10 also supports the aerodynamic root thrust of the blade 16 and torque components. However, a bearing or bushing sleeve used for this purpose can be significantly smaller than that required by a conventional rotor blade because the high centrifugal load of the blade 16 of the present invention, up to 150 times greater than air loads, is supported separately by the double support tennons 20 of the invention. These support tennons 20 provide the primary means of supporting the blade 16 and introduce some torsional resistance, but very little frictional resistance. In addition, the clevis 30 and hub post can offer a secondary means of retaining the blade 16 and cradle 28 (e.g., via the use of a bolt, fastener, security retainer, or the like, which may be threaded) in addition to the primary support straps. The pin root blade design, in combination with the added support capacity of tennons 86 in clevis 30, provide an added measure of safety in the event of an accidental incident such as impact with foreign debris (large birds or runway debris) where blade bending loads resulting from impact can be many times as great as normal operating forces.

An additional benefit for turbofan engines, derived from the use of angled straps and a center pivot post on each blade 16, is the slight inward and outward movement that accompanies blade pitch change. At takeoff, and also at landing, the two times when blade angle is lowest due to low forward speed, the blade 16 is pulled slightly inward. For the high-speed cruise condition, the blade angle is increased to its highest position, which moves the blade slightly to a more outward position. The latter has the advantage of minimizing the blade-to-duct tip gap, particularly in cruise, where aircraft spend most of their time on long flights. In the former condition, the blade 16 is pulled in, which prevents blade tip rub when the plane is in contact with the ground, and the inertia of the disc can cause the shaft centerline to deflect off center, especially during a hard landing or on an uneven runway. With blade movement resulting from the present invention as described, the efficiency can be maximized at cruise speeds.

The use of at least two support members 40, offset or angled relative to one another, counteracts the natural TTM tendency of the blade 16 that turns it toward low pitch. This design provides a means of separating the blade structure from the pitch change system. In its simplest form, the inboard end or root part of these two support tennons 20 can be fixed efficiently to the central hub 34 with two separate support members 40 (these support members can be circular or non-circular to optimize structure). Furthermore, to reduce torsional stress in the support tennons 20, each of these two tennons can be replaced with two or more separate support tennons as a possible improvement of the invention. One or both of the support members 40 can also include a bearing mechanism, allowing independent rotation of one or more support tennons 20. Should loss of pitch control occur and/or loss of engine power, a desired pitch setting can be obtained by careful spatial placement of the support tennon 20 attachment points in the central hub 34. The placement would be biased such that blade TTM, affected by high centrifugal tension loads on two support paths instead of one, remains balanced and/or moves to a desirable setting(s) for any given rotor speed(s) or flight condition, such as cruise. Attachment points and resulting angular settings can first be determined by analyses and then verified by tests.

The support tennons 20 may be fabricated from carbon fiber materials or other suitable high strength fibrous materials fabricated in a resinous and/or rubber based matrix system. Such carbon fiber materials are capable of withstanding the stresses and forces encountered in the operation of aircraft engines. The present invention is not limited in this regard, as the support tennons 20 may be metal (e.g., steel wire) and coated with a rubber material, fibrous polyamide, or fibrous glass.

Figure 7:
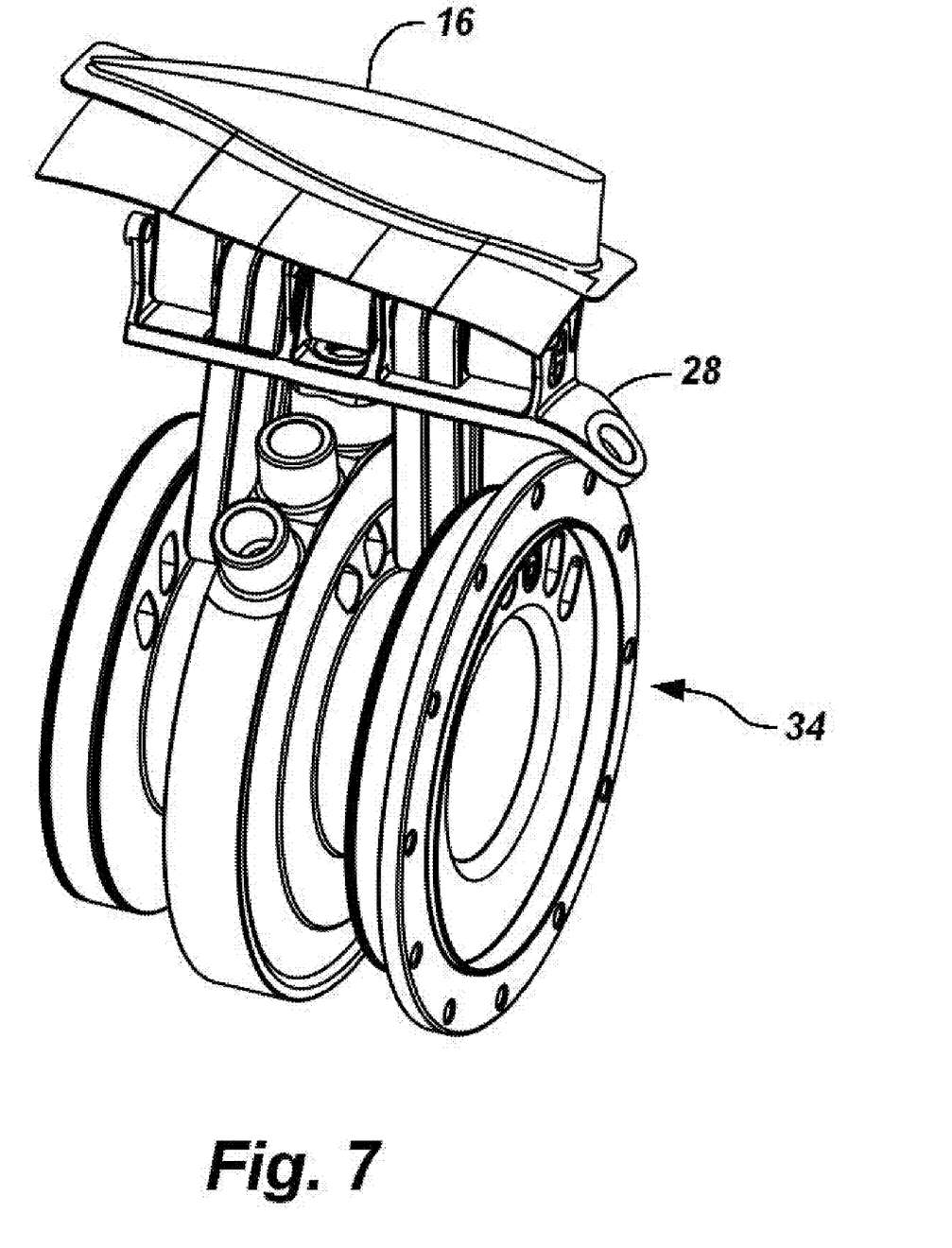
FIG. 7 is a front perspective view of a system for retaining a rotor blade of an aircraft in which the timing ring posts can be connected to the pin root portion of the rotor blade at a point on a cradle.

In the system 10, blade angular pitch change is accomplished by use of a timing mechanism or timing ring 46 that acts simultaneously with posts 76 engaging a slot in a pitch arm 74, which is an extended part of each blade pin 18, forward and/or aft of the blade. Such extension provides a mechanical advantage to the pitch change system. The present invention is not limited to the action of the posts 76 on timing ring interfacing with slots in the pitch arm 74 extensions of blade pins 18, as the timing ring may be used to change the blade angular pitch by having the posts 76 interface directly with a slot in a portion of the cradle as shown in FIG. 7. The collective timing mechanism(s) and central blade pivot feature also ensure consistency of blade-to-blade pitch angle settings. The timing ring can be activated conveniently by a mechanism such as a gear arrangement, as described herein. The timing ring 46 can alternatively be operated by a mechanism known as a Harmonic Drive, which could be driven by a small electric or hydraulic motor, especially with the reduced pitch control loads offered by this invention.

Figure 3:
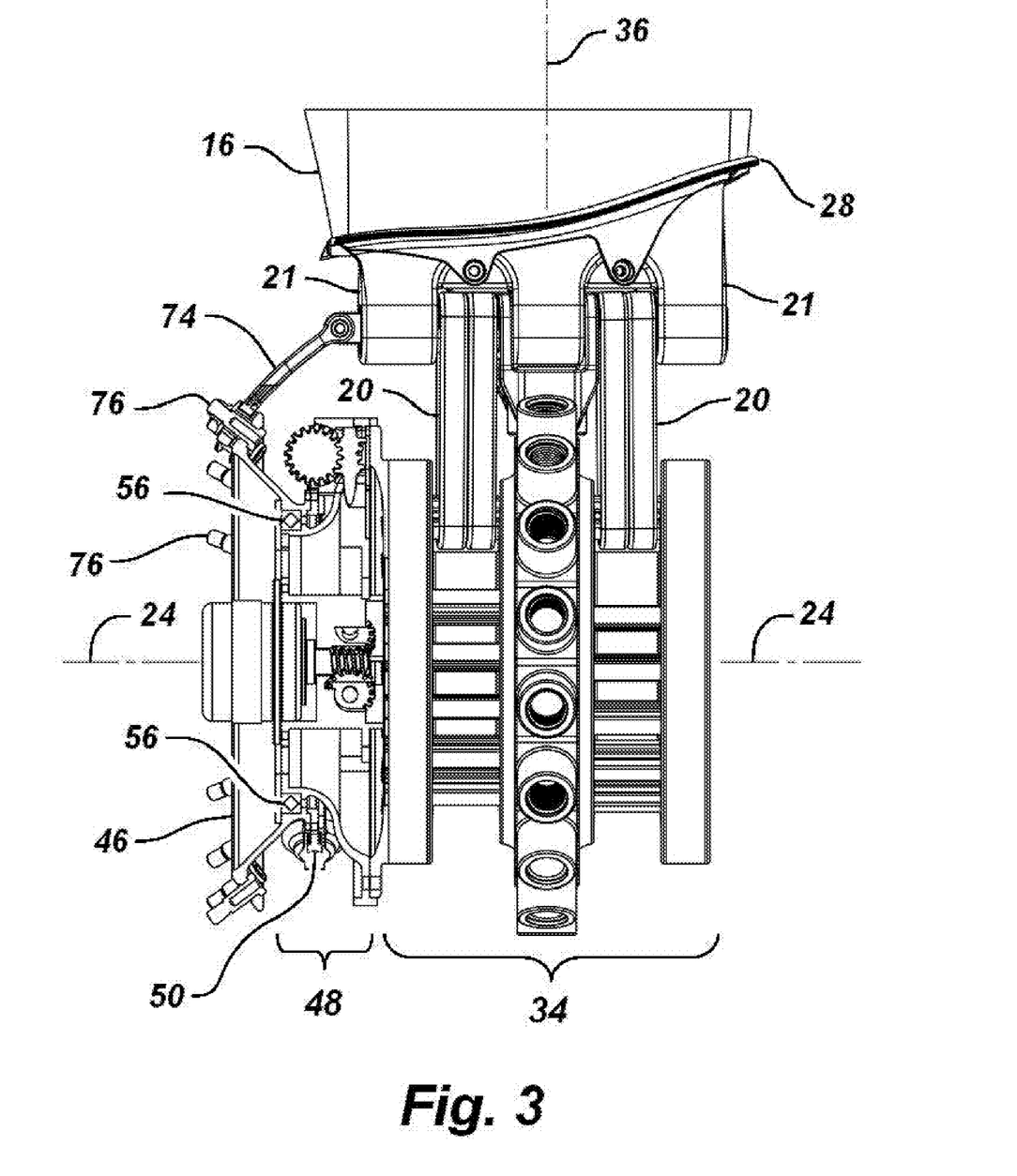
FIG. 3 is a side view of the system of FIG. 1 showing a partial section through gear frame 48 and the pitch adjusting mechanism.
Figure 4:
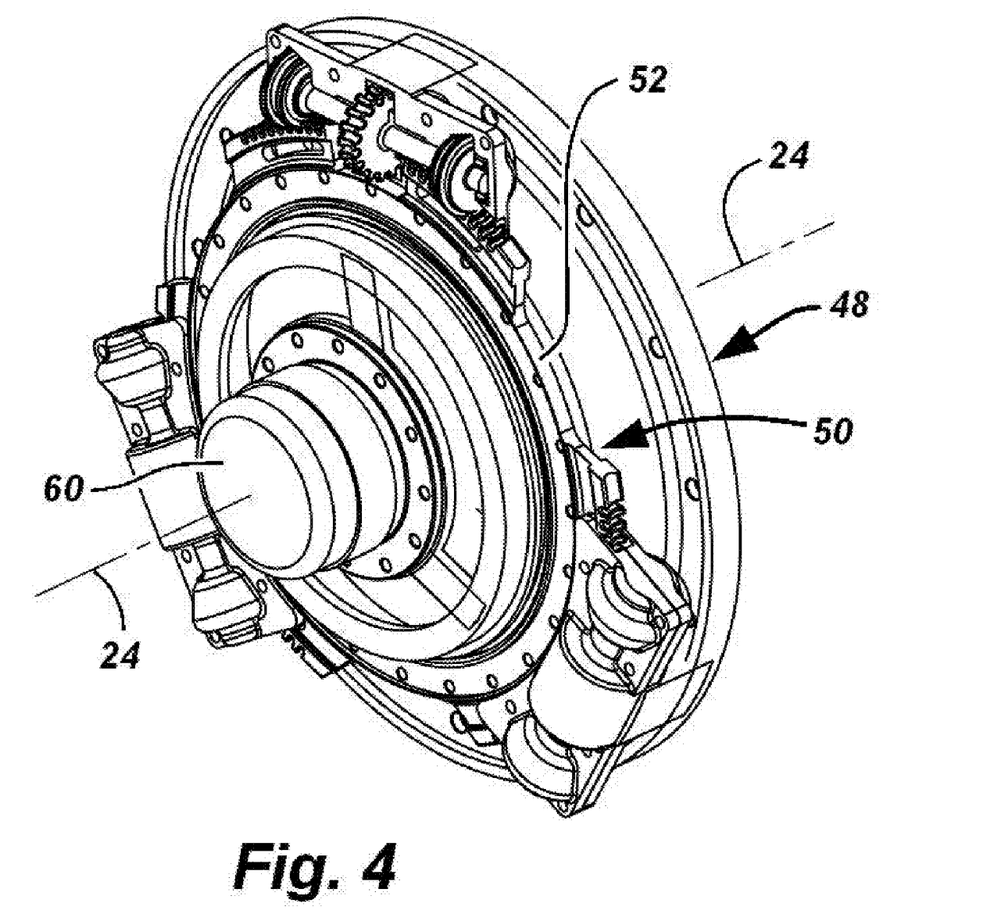
FIG. 4 is a perspective view of a gear frame of the system of FIG. 1 with central drive motor attached.

Referring now to FIG. 3, a gear frame 48 is attached to a forward face of the central hub 34. Referring now to FIG. 4, the gear frame 48 comprises a ring structure that is mounted to the forward face of the central hub 34 via bolts or any suitable attachment devices. A segmented gear 50 is bolted or otherwise attached directly to the back of the timing ring 46 and operably passes through in slots in local housing(s) in the forward face of the gear frame 48.

Figure 5:
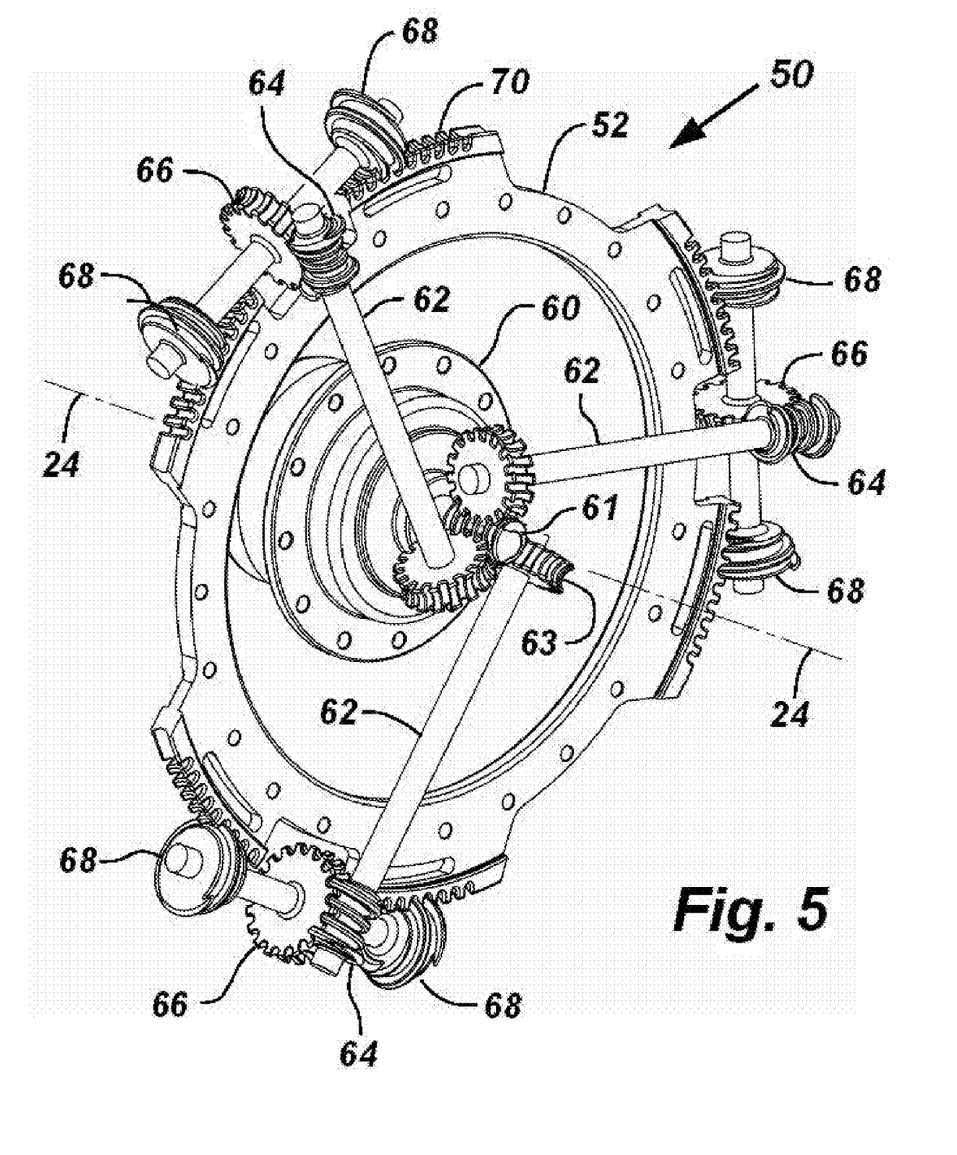
FIG. 5 is a rear perspective view of the segmented gear and worm gear drive system with support components of the gear frame removed for clarity.

Referring now to FIG. 5, the segmented gear 50 comprises a ring member 52 that rotates relative to the gear frame 48 about the rotor centerline 24. Rotation of the ring member 52 on the forward face of the segmented gear 50 is effected by a bearing (shown at 56 in FIG. 3), which allows rotation of both the gear 52 and attached timing ring 46 relative to gear frame 48.

A drive mechanism such as a drive motor 60 is located in the center of the segmented gear 50 on the rotor centerline 24. Torque from the drive motor 60 is conveyed through a worm 61 to a plurality of worm gears 63 and a plurality of offset drive shafts 62, which are each operably connected to and interface with a corresponding number of worms 64 located on the ring member 52. Each of the worms 64 drives a corresponding worm gear 66, which accordingly drives gears 68, which in turn operably engage drive gear teeth 70 to rotate the segmented gear 50 relative to the gear frame 48. Three drive shafts 62 are shown as conveying the torque from the drive motor 60 to corresponding worms and worm gears. The present invention is not limited in this regard as any number of drive shafts can drive worms and worm gears to effect the rotation of the segmented gear 50 on the gear frame 48.

The use of the drive motor 60 to convey torque through a plurality of drive shafts to drive gears 70 enables the drive motor to operate at high speeds (high revolutions per minute), thereby allowing for minute changes in rotation of the ring member 52 about the rotor centerline 24. The drive motor 60 could be electric, hydraulic, a combination thereof, or driven by any other suitable means.

Furthermore, the present invention is not limited to the use of the segmented gear 50 and the gear frame 48, as these components could be replaced by any other suitable device such as a harmonic drive or the like.

Figure 6:
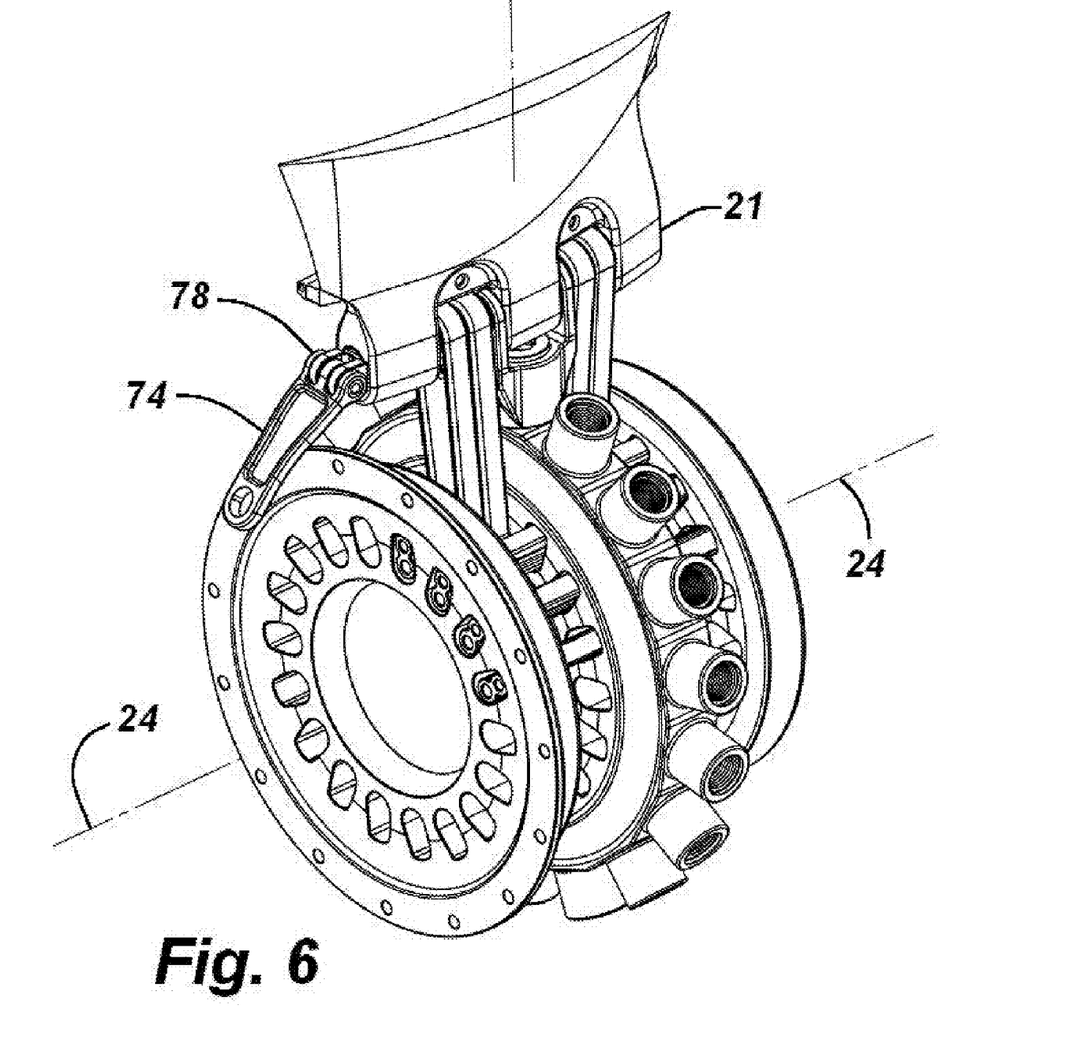
FIG. 6 is a front perspective view of the system of FIG. 1 showing the hinged connection of a pitch arm to the blade pin at the pin root portion of a rotor blade.

Referring now to FIGS. 3 and 6, the timing ring 46 is connected to the pins 18 via pitch arms 74. Forward ends of pitch arms 74 are connected to posts 76 on the timing ring 46 such that rotation of the timing ring 46 allows the forward ends of the pitch arms 74 to rotate, flex, or otherwise move relative to the timing ring. Rearward ends of the pitch arms 74 are connected to pin/clevis arrangements 78 on the ends of the pins 18. The pin/clevis arrangements 78 allow for the movement of the pitch arms 74 relative to the pins 18.

The present invention is not limited to the connection of the posts 76 on timing ring 46 to slots in pitch arms 74 and in turn to the pins 18. Referring to FIG. 7, the posts 76 may be connected or otherwise interface directly with a slot in the cradle 28 to effect pitch change of the blade.

Figure 8:
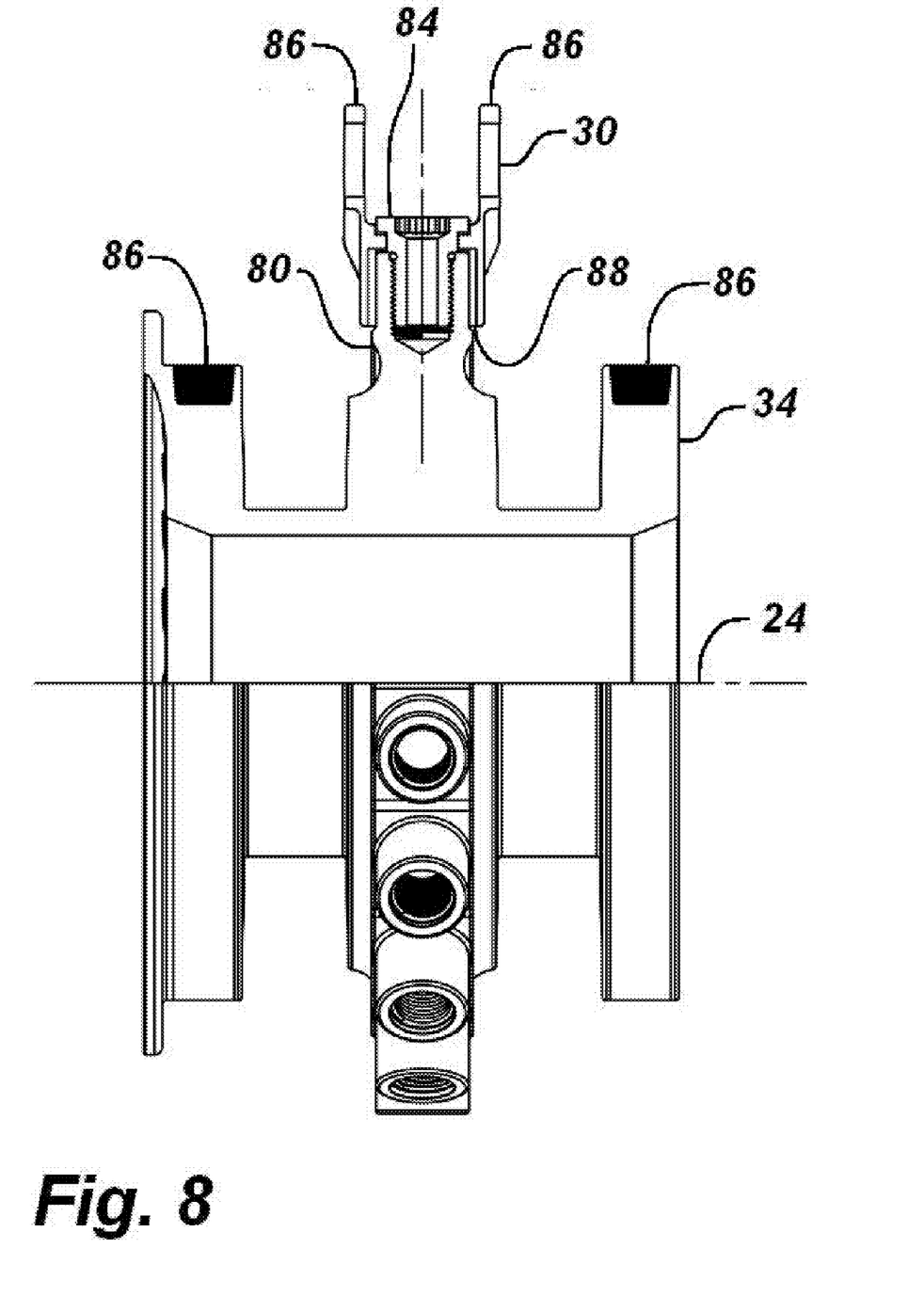
FIG. 8 is a side view with partial upper section through a rotatable clevis on the central hub for attaching the pin root portion of the rotor blade.

Referring now to FIG. 8 the central post over which the clevis 30 is mounted on the central hub 34 is shown at 80. The central post 80 receives the clevis 30 and is fastened thereto using a bolt 84 or other suitable fastener. A bushing 88 is located between the outer surface of the central post 80 and the inner surface of the clevis 30. The clevis 30 includes two wings 86 having openings therein for accommodating the pin 18. Also shown in FIG. 8 are two optional carbon fiber windings 85 (black) over the fore and aft rings of the hub to increase hoop load capacity, helping to resist large blade centrifugal loads generated at fan rotational operating speeds.

Figure 10:
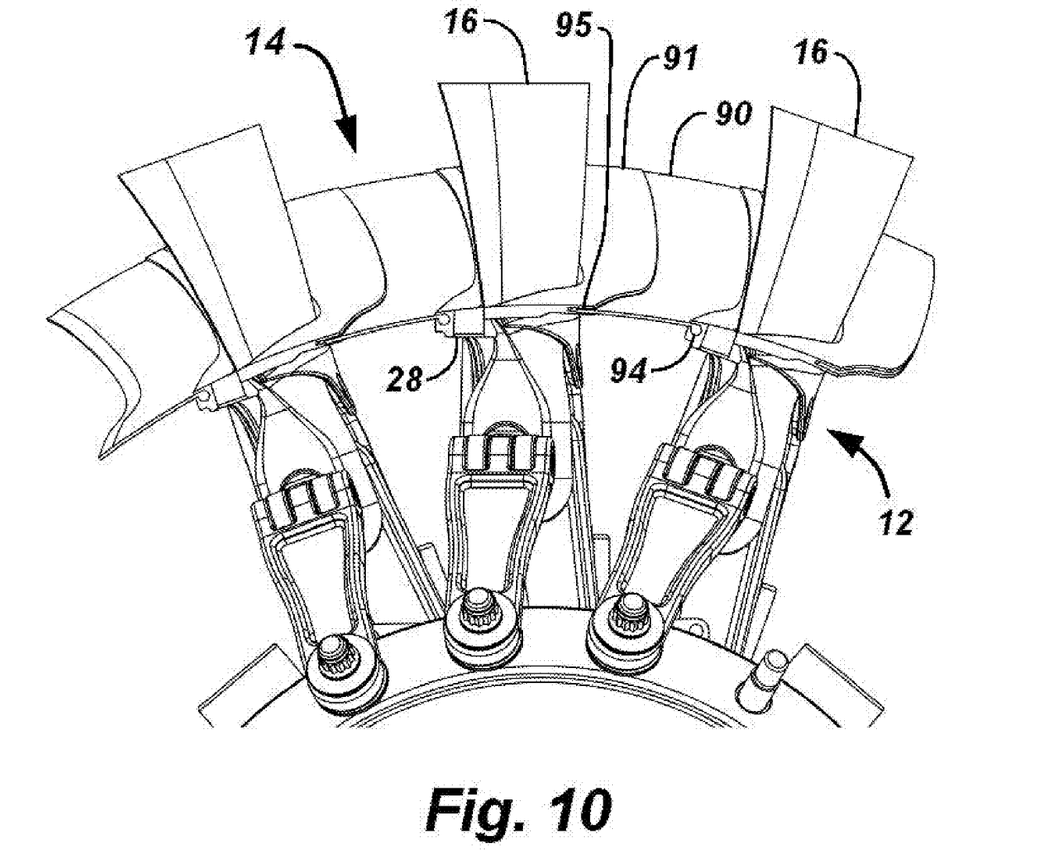
FIG. 10 is a front view of platforms located between the blades and defining a surface of the centerbody airflow path.

Referring now to FIG. 10, the centerbody airflow path 14 is defined above the pin root portion 12 and in the spaces between the blades 16. The cradles 28 on which the blades 16 are located are connected to adjacent cradles by platforms 90 and 91. A platform 90 is connected to the cradle 28 by engaging one edge 92 thereof in a J-slot 94 located on a corresponding edge of the cradle. An opposing edge 95 of the platform 90 engages a slot in adjacent platform 91, which is connected to the cradle 28 simultaneously with the mechanisms by which the blade is connected to the cradle. A nosecone or similar apparatus (not shown) is fitted over the central hub 34 such that an edge thereof is positioned at a forward edge of the platforms 90 and 91.

Many benefits are derived from this invention. First, discreet spatial positioning of support member attachment points in the hub can be used to balance a rotor blade's TTM and achieve a desired pitch angle setting for a given operating condition(s), in the event pitch control is lost. Second, this design eliminates the need for rotor blade counter-weights and/or other more complicated pitch control backup systems in the event there is loss of blade pitch control. Third, it provides a structurally efficient, compact means of retaining a large number of fan blades in a single rotor such as are used in turbofan engines (18 to 22 blades or more), while providing a means of varying pitch angle of all blades simultaneously. Fourth, it has servicing advantages because it allows relatively simple removal and replacement of a single blade, blade pin and/or cradle device, without the need for removal of the entire rotor. Fifth, blades move inward and outward slightly when blade pitch angle is reduced and increased, respectively, providing beneficial clearance in ground operations and maximizing efficiency in cruise.

Finally, this invention allows adjustment of the blade pitch angle to match air flow variations and greatly improve efficiency at all operating conditions. Not having a variable-pitch feature is like driving an automobile in second gear in all conditions. Without a variable-pitch feature, engine start-up would slow to avoid stalling the engine, and high speed is wasteful because the engine is turning faster than it needs to, and much fuel is wasted. Therefore, once cruise speeds are achieved, fuel could be reduced as blade angle is increased.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the following claims.

What is claimed is:

1. A system for providing variable pitch to a rotor blade of an aircraft engine, the system comprising:
   a rotatable hub;
   at least one blade mounted on the rotatable hub;
   a gear mechanism operably connected to the rotatable hub;
   a timing ring rotatably and operably connected to the gear mechanism; and
   a pitch arm operably connecting the timing ring and the at least one blade mounted on the rotatable hub;
   wherein operation of the gear mechanism rotates the timing ring to vary the pitch of the at least one blade mounted on the rotatable hub.

2. The system of claim 1, further comprising flexible tennons connecting the at least one blade to the rotatable hub.

3. The system of claim 2, wherein the flexible tennons are fabricated from a carbon fiber material.

4. The system of claim 2, wherein the flexible tennons are fabricated from fibrous polyamide.

5. The system of claim 2, wherein the flexible tennons are fabricated from fibrous glass.

6. The system of claim 2, wherein the flexible tennons are fabricated from fibrous materials in a resinous matrix system.

7. The system of claim 1, further comprising a pin, the at least one blade being connected to the pin, and the pin being connected to the rotatable hub.

8. The system of claim 1, wherein the at least one blade includes blade tennons depending therefrom, the blade tennons being connected to support tennons extending from the rotatable hub, the blade tennons and the support tennons being connected to a pin.

9. The system of claim 1, wherein the at least one blade is rotatably mounted on a post extending from the rotatable hub.

10. The system of claim 1, wherein the gear mechanism comprises a gear frame mounted to a forward face of the rotatable hub, and a segmented gear operably mounted to the gear frame.

11. The system of claim 10, further comprising a drive mechanism operably connected to the segmented gear.

12. The system of claim 11, wherein the operable connection of the drive motor to the segmented gear comprises an arrangement of worms and worm gears, the operation of which cause the rotation of the segmented gear and the timing ring.

13. A system for retaining a fan blade of an aircraft and providing variable pitch to the fan blade, the system comprising:
    a rotatable hub;
    at least one fan blade mounted on the rotatable hub;
    a gear mechanism operably connected to the rotatable hub;
    a drive mechanism connected to and in operable communication with the gear mechanism;
    a timing ring rotatably and operably connected to the gear mechanism; and
    a pitch arm operably connecting the timing ring and the at least one fan blade mounted on the rotatable hub;
    wherein operation of the drive motor rotates the timing ring via the gear mechanism to vary the pitch of the at least one fan blade mounted on the rotatable hub.

14. The system of claim 13, wherein the gear mechanism comprises,
    a gear frame mounted to the rotatable hub;
    a segmented gear rotatably mounted to the gear frame; and
    a bearing located between a forward-facing surface of the gear frame and a rearward-facing surface of the segmented gear;
    wherein the drive motor is mounted to the gear frame; and
    wherein the segmented gear is rotatable on the bearing by the drive motor.

15. The system of claim 13, wherein the drive motor includes a first worm, a worm gear is in operable communication with the first worm, and the worm gear is in operable communication with a second worm located on the gear mechanism, the operation of the drive motor causing the rotation of the gear mechanism and the timing ring.

16. The system of claim 13, further comprising a pin connecting a root portion of the fan blade to the rotatable hub.

17. The system of claim 16, further comprising blade tennons extending from the root portion of the fan blade and connecting to the pin and support tennons connected to the rotatable hub and the pin.

18. The system of claim 13, wherein the pitch arm is operably connected to the timing ring and to a pin to which the at least one fan blade is attached.

19. The system of claim 13, wherein the pitch arm is operably connected to the timing ring and to a cradle to which the at least one fan blade is attached.

20. A system for providing variable pitch to a rotor blade of an aircraft engine, the system comprising:
    a rotatable hub;

at least one blade mounted on the rotatable hub;
a gear mechanism operably connected to the rotatable hub;
a timing ring rotatably and operably connected to the gear mechanism;
a pitch arm operably connecting the timing ring and the at least one blade mounted on the rotatable hub;
flexible tennons connecting the at least one blade to the rotatable hub; and
a pin, the at least one blade being connected to the pin, and the pin being connected to the rotatable hub;
wherein operation of the gear mechanism rotates the timing ring to vary the pitch of the at least one blade mounted on the rotatable hub.

* * * * *